United States Patent
Mossa et al.

(10) Patent No.: US 11,982,600 B2
(45) Date of Patent: May 14, 2024

(54) TRAP FOR HORIZONTAL FLOW MARINE SEDIMENTS

(71) Applicant: POLITECNICO DI BARI, Bari (IT)

(72) Inventors: Michele Mossa, Bari (IT); Mouldi Ben Meftah, Bari (IT); Francesca De Serio, Bari (IT); Marco Orsi, Melazzo (IT); Sergio Tucci, Chiavari (IT); Antonio Siccardi, Tiglieto (IT); Antonio Felice Petrillo, Bari (IT)

(73) Assignee: POLITECNICO DI BARI, Bari (IT)

( * ) Notice: Subject to any disclaimer, the term of this patent is extended or adjusted under 35 U.S.C. 154(b) by 407 days.

(21) Appl. No.: 17/422,199

(22) PCT Filed: Jan. 17, 2020

(86) PCT No.: PCT/IB2020/050374
§ 371 (c)(1),
(2) Date: Jul. 11, 2021

(87) PCT Pub. No.: WO2020/152553
PCT Pub. Date: Jul. 30, 2020

(65) Prior Publication Data
US 2022/0120644 A1    Apr. 21, 2022

(30) Foreign Application Priority Data

Jan. 22, 2019  (IT) .................... 102019000000931

(51) Int. Cl.
*G01N 1/20*  (2006.01)
*G01N 1/10*  (2006.01)

(52) U.S. Cl.
CPC ....... *G01N 1/20* (2013.01); *G01N 2001/1025* (2013.01); *G01N 2001/1031* (2013.01)

(58) Field of Classification Search
CPC ............ G01N 1/20; G01N 2001/1025; G01N 2001/1031
See application file for complete search history.

(56) References Cited

U.S. PATENT DOCUMENTS

| | | | | |
|---|---|---|---|---|
| 3,400,575 A | * | 9/1968 | Madden | G01N 1/2202 |
| | | | | 210/94 |
| 4,762,009 A | * | 8/1988 | Scrudto | G01N 1/2035 |
| | | | | 73/863.52 |

(Continued)

FOREIGN PATENT DOCUMENTS

| | | | | |
|---|---|---|---|---|
| CN | 107478458 A | * | 12/2017 | ......... B01D 21/0012 |
| GB | 2085843 A | * | 5/1982 | ............... G01N 1/10 |

OTHER PUBLICATIONS

Bouisfi et al, The effect of inlet and outlet position and sediments concentration on sedimentation tank efficiency, from IEEE Xplore. (Year: 2018).*

(Continued)

*Primary Examiner* — David L Singer
(74) *Attorney, Agent, or Firm* — R. Ruschena Patent Agent, LLC

(57) ABSTRACT

A trap for horizontal flow marine sediment, useful for collecting and sampling marine sediments where horizontal currents are intense and turbulent; the trap is comprising a first inlet opening and a second outlet opening, configured to allow the inlet and the outlet of a marine current, the path between the two openings comprising: an inlet area with a divergent section, connected to the first inlet opening; a sedimentation area with a greater section with respect to the inlet area, in order to allow gravity separation of particles present in the marine current.

(Continued)

The trap also has an outlet area whose section converges in terms of width between the section where the outlet area is connected to the sedimentation area and to the second outlet opening.

9 Claims, 6 Drawing Sheets

(56) References Cited

U.S. PATENT DOCUMENTS 6,494,084 B1* 12/2002 Roberts .................. G01N 11/00
                                                              73/86
2019/0086299 A1* 3/2019 Guo ........................ C02F 1/001

OTHER PUBLICATIONS

Elliott et al, A novel method for sampling the suspended sediment load in the tidal environment using bi-directional time-integrated mass-flux sediment (TIMS) samplers, Estuarine, Coastal and Shelf Science 199 (2017) 14-24, Elsevier (Year: 2017).*

Siegel et al, Trajectories of sinking particles in the Sargasso Sea: modeling of statistical funnels above deep-ocean sediment traps, Deep-Sea Research I, vol. 44, No. 9-10, pp. 1519-1541, 1997, Elsevier Science (Year: 1997).*

\* cited by examiner

TRAP FOR HORIZONTAL FLOW MARINE SEDIMENTS

BACKGROUND OF THE INVENTION

1. Field of the Invention

The present invention relates to a trap for horizontal flow marine sediments, useful for collecting and sampling marine sediments where horizontal currents are not of minor importance.

2. Brief Description of the Prior Art

At the state of the art, various embodiments of marine sediments traps are known, described in literature, as for example Coale (1990), Valdes and Price (1999), Honjo (2001) and Lampitt (2001). Sediments traps are containers put in the seas and oceans by researchers interested in marine environments, in order to collect the particles tending to fall on the seabed. The traps collect fine sediments or deposits of a certain entity as well, known as "marine snow", made up of organic matter, dead marine organisms, minute shells, powder and minerals.

The analysis of the collected samples allows the researchers to evaluate movements of nutrients and oligo-elements such as carbon, nitrogen, phosphorus, calcium, silicon and uranium from the ocean surface to the deep ocean. These elements represent the food for almost the whole of life forms in deep waters, since at high depths the plant species cannot grow up due to the absence of the light needed for the photosynthesis. Researchers are also interested in analyzing the elements present in traces to collect clues about the ocean circulation in the past eras.

The interest in the possibility to carry out these analyses (and also other ones, which are not described here for brevity) has led to the realization of the sediments traps known at the state of the art. The currently available sediments traps are vertically developed and are generally provided with a great funnel, whose greater opening is directed upwards, and with a collecting container for sediments on the bottom, positioned at the minor opening of said funnel and configured to collect sediments deposited inside the funnel.

The dimensions of the funnel opening are typically a standard value (generally between 0,25 and 0,62 square meter), and a grid is conveniently provided on such opening to prevent objects of great dimensions from entering, thus obstructing the trap.

A typical installation mode of the trap provides that the same is coupled to a cable, fixed to a buoy, so that the trap is suspended at a definite depth. As an alternative or in addition the trap can be fastened to an anchor or a ballast by means of suitable cables.

After installation, a certain time interval (typically at least some months) is waited, before a ship passes by again for retrieving the trap. In order to ease the retrieving some traps comprise a decoupling means of the trap from the ballast, which can be actuated by a remote control, by means of which it is possible to detach the trap from its anchorage to make it go up by means of the floatation effect, thus bringing in surface both the trap and the collected samples.

Other embodiments known at the state of the art provide that the trap comprises a plurality of collecting containers and an automatized system which allows to change the collecting container positioned under the funnel at pre-set interval times or as a function of signals sent by sensors which control the features of the water (such for example temperature and pH).

So, each collecting container collects the samples relative to a known time interval, and this measure allows the assembly to function continuously also for a two-year time interval.

Some embodiments known at the state of the art are described in the Patents documents CN107487458, GB2085843, U.S. Pat. No. 4,762,009, as well as in the article by Emily A. Elliot et al. "A novel method for sampling the suspended sediment load in the tidal environment, using bi-directional time integrated mass flux sediment (TIMS) samplers", Estuarine, Coastal and shelf science, vol. 199, 2017.

Technical Problem

Even if the traps for marine sediments are currently used by now, yet some unsolved problems which limit their efficacy of use remain.

In particular, a first critical point in the usage of the traps of the just described type are the currents which, when intense, can drag sediments beyond the trap, thus not allowing their falling, and so, their trapping. This phenomenon causes an error in the quantitative evaluation of the particles present in the water and in their sedimentation process which is difficult to be corrected adequately.

In order to solve, even only partially, this problem some traps for sediments have been designed, always with vertical development, which are balanced with respect to the floatation forces and, which move according to the prevailing currents, while always remaining at a specific depth during the sediment collecting.

Another typical limit of the sediments traps known at the state of the art is that they have to remain vertical in the water in order to function correctly. The traps positioned in areas with intense currents have to adjust the inclination angle continuously, so that the researchers can define the time intervals during which the sampling results compromised due to an excessive inclination.

Another technical problem is that the samples can influence themselves. In fact, since the deep ocean is characterized by lack of nutrients, also a collecting container full of sediments represents an important quantity of nutrients for the local zooplankton. In some traps, a good portion of the sediments can come from "swimming" organisms trapped, which look for food, and so, they are not representative of the sedimentation phenomenon, the trap study was positioned for.

Generally, it can be said that the first studies on the traps in the water column (1970-80) are based on the sedimentation process with vertical falling of the particles in the water.

Recent studies (Siegel and Deuser, 1997) show how the currents approaching a trap are very complex due to the presence of horizontal movements and spatial lack of homogeneity in the processes causing the particles to sink. In presence of very turbulent currents, the traditional sediments traps do not function correctly or do not function at all.

SUMMARY OF THE INVENTION

Therefore, aim of the present invention is to provide a trap for marine sediments which overcomes the limits linked to the traps known at the state of the art.

More in particular, aim of the present invention is to provide a trap for horizontal flow marine sediments able to function efficiently also in presence of intense and turbulent currents.

The present invention realizes the prefixed aims since it is a trap (1) for marine sediments, characterized in that it comprises on two vertical sides, opposite to each other, a first inlet opening (10) and a second outlet opening (11), configured to allow the inlet and the outlet of the marine current, said trap (1) comprising between said two openings (10, 11): an inlet area (12), whose section diverges in terms of width between said inlet opening (10) and the end section (122) of said inlet area (12); a sedimentation area (13) having a section greater than said end section (122) of the inlet area (12), configured to allow the separation by gravity of the particles present in the marine current, and an outlet area (14) whose section converges in terms of width between the section where said outlet area (14) is connected to said sedimentation area (13) and said second outlet opening (11) characterized in that the section of said inlet area (12) converges in terms of height between said inlet opening (10) and its own end section (122), the bottom of said inlet area (12) being convergent upwards and in that the section of said outlet area (14) diverges in terms of height between the section in which said outlet area (14) is connected to said sedimentation area (13) and said second outlet opening (11).

BRIEF DESCRIPTION OF THE DRAWINGS

The trap according to the invention will be described now with reference to the appended drawings 1 to 5, which show preferred embodiments of the invention.

FIGS. 1 and 2 show respectively upper and lower perspective views of a first preferred embodiment of the trap, of which

DETAILED DESCRIPTION OF THE INVENTION

Figure 1:
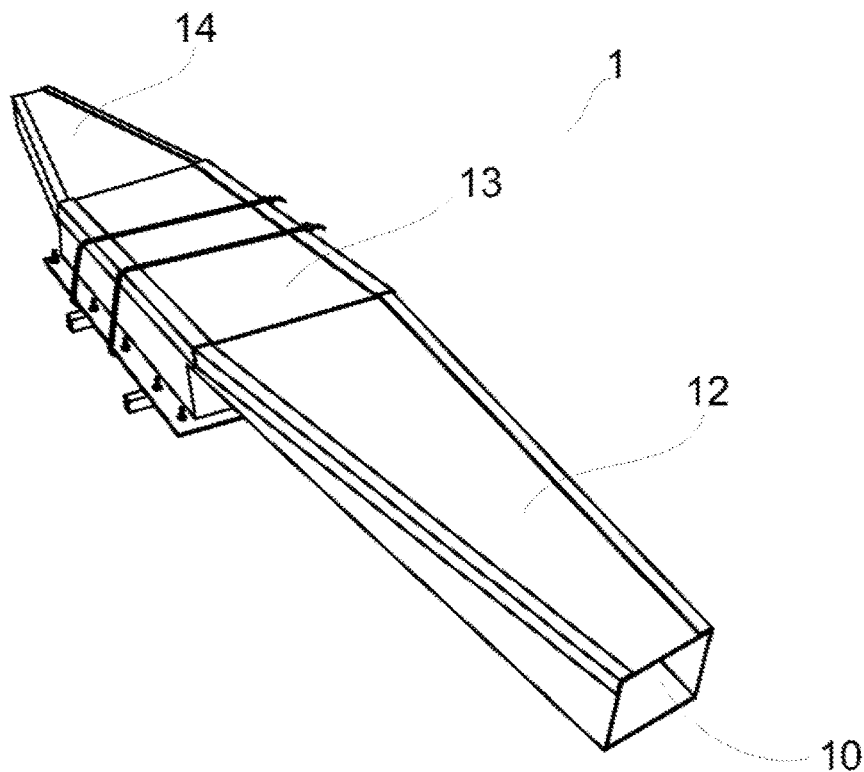
Figure 2:
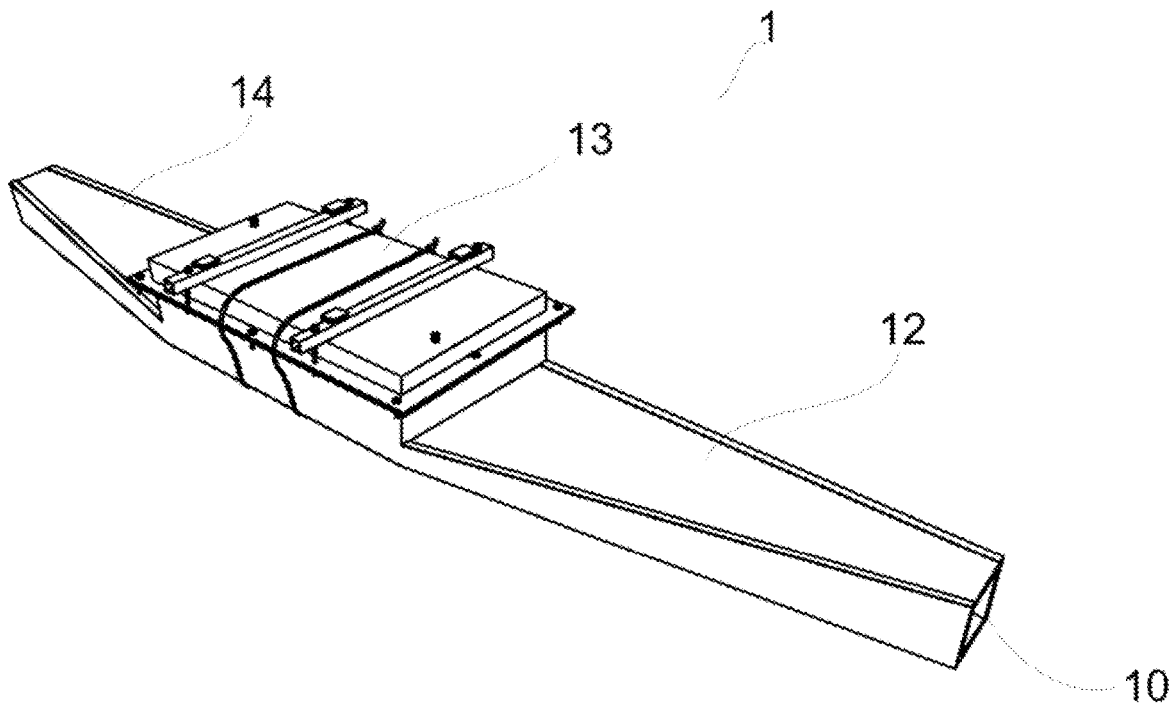

As it is shown in the appended FIG. 1, the trap (1) according to the invention has a vertical development, and on two vertical planes, opposite to each other, is provided with a first (10) and a second opening (11), configured to allow the inlet and outlet of the marine current with sediments dragged thereby.

Figure 4:
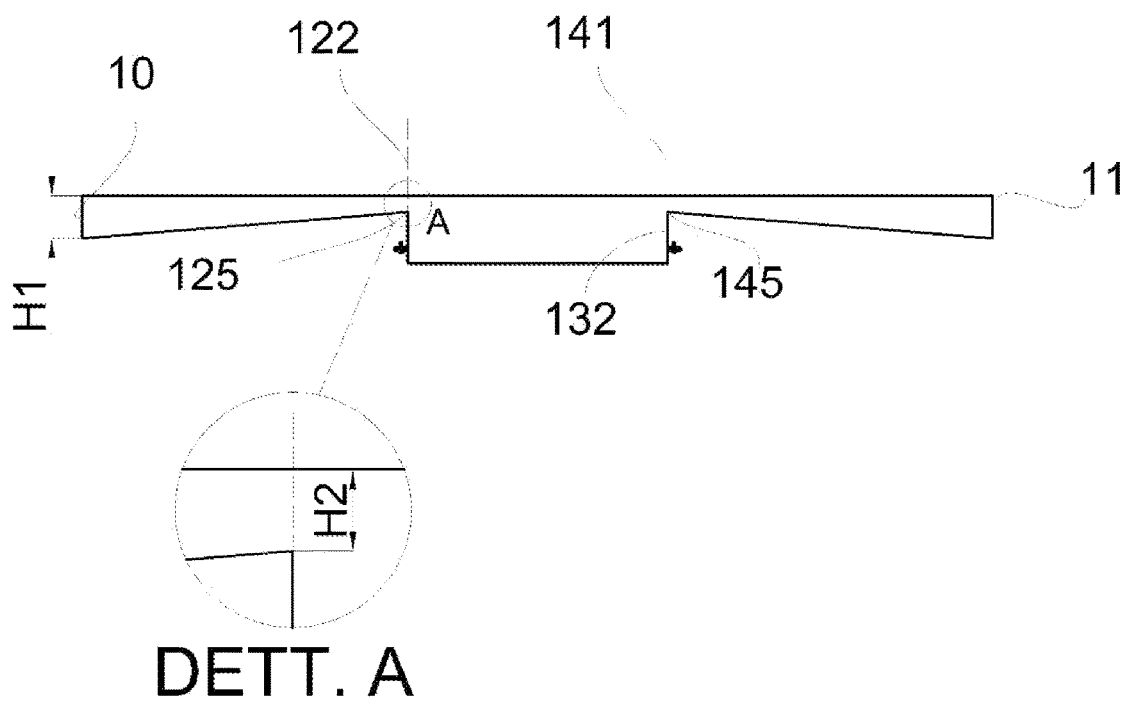
FIG. 4 shows a section view.
Figure 5:
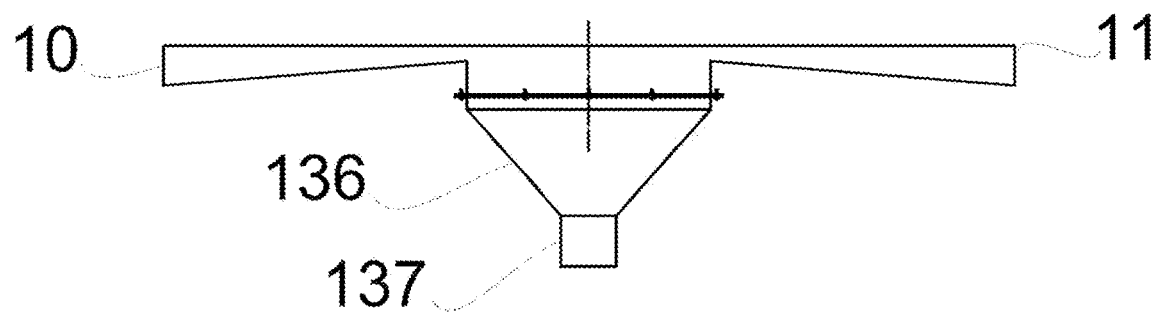
FIG. 5 shows a side view of a second embodiment.

As it is clear from the vertical section view of FIG. 4, inside the trap (1), proceeding from the inlet opening (10) to the outlet opening (11) an inlet area (12), a sedimentation area (13) and an outlet area (14) are provided.

The inlet area (12) is a duct divergent in plan and convergent upwards (for "inviting" the flow in the upper portion of the sedimentation chamber).

According to a first embodiment the end section (122) and the inlet opening have equal areas; in a second embodiment the end section (122) of the inlet area has greater dimensions then the inlet opening (10), so that the water speed diminishes inside the sedimentation chamber. But such section increase has to be contained in percentage, so to avoid that the slowing down of the current causes an increase in pressure which is counter-producing with respect to the need to make the particles flow towards the sedimentation chamber (13). Preferably, said section increase is lower than 20%, and more preferably lower than 10%.

In the vertical section view of FIG. 4 it is possible to appreciate that, in a preferred embodiment, the inlet area (12) has a decreasing vertical development, and has however an increasing horizontal development, as it can be seen from the horizontal section view of FIG. 4. In particular, with reference to FIG. 1, the width (L2) of the end section (122) of the inlet area (12) is greater than the width (LI) of the inlet opening (10), and the height (H2) of the end section (122) of the inlet area (12) is lower than the height (HI) of the inlet opening (10). The technical effect of this measure is to obtain a duct, where at the same time, the flow slows down and anyway the falling depth of a sediments diminishes, so that it can be collected, as it is clear in the following description.

A sedimentation area (13) is in fact next the inlet area (12). The sedimentation area (13) is provided with a constant width and equal to the width (L2) of the end portion of the inlet area, but it is provided with a depth increase as well. In a first embodiment, this depth increase is rapid and occurs at the joining section of the two areas.

While crossing the sedimentation area (13) in the direction of its length (Ls), the solid particles contained in the flow tend to sediment, according to the well-known sedimentation law.

The length and depth of the sedimentation chamber are obviously design parameters variable as a function of the average diameter expected of the particles to be sedimented and of the average and maximum speed expected for the current. As a way of example, anyway it can be said that the section of said sedimentation chamber has to be at least twice the end section (122) of the inlet area (12) and preferably equal to a least four times said end section (122).

At the end of the sedimentation area (13), a new section change joins it to the outlet area (14), whose initial section (141) has preferably the same dimensions as the end section of the inlet section. In particular, the height of the lower edge (145) of the coupling section of the outlet area (14) is at least at the same height of the lower edge (125) of the end section (142) of the inlet area (12). In this way, the wall (132) at the end of the sedimentation area (13) will avoid dragging and the possible outgoing of those particles which began their sedimentation falling.

Preferably, but not limitingly, said wall (132) is smooth and coated with a material with low surface adherence features, so that the particles do not tend to adhere on the same but can precipitate on the bottom (133) of the sedimentation area (13), as described in the following.

Figure 3:
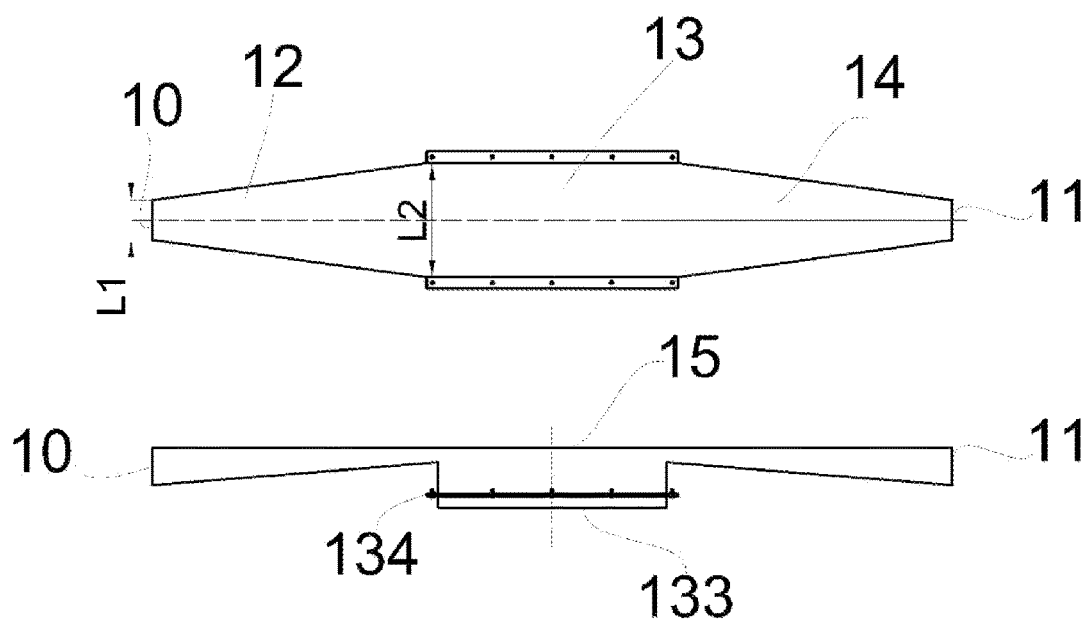
FIG. 3 shows a top and a side view.

According to another embodiment not shown in figure, the height of the lower edge (145) of the coupling section of the outlet area (14) is at a upper height with respect to the lower edge (125) of the end section (122) of the inlet area (12). Preferably, also, as it can be seen both from the side view in FIG. 3 and the vertical section view of FIG. 4, the upper face (15) of the trap (1) is flat and horizontal, in order to obtain the just described slowing down effects of the flow thus minimizing the turbulence induced by the same.

While describing now the outlet area (14), according to a preferred embodiment, the same is symmetrical to the inlet area (12) with respect to a vertical plane orthogonal to the current flow and passing across the middle of the sedimentation area (13). In this way, with an outlet section equal to the inlet section, the water speed at these sections will be equal. Moreover, by realizing the inlet section of the trap with a sufficiently great area in relation to the current speed outer to the trap, it can be assumed that such speed will be approximately maintained in the inlet duct, whose length and structure tend to minimize undesired turbulence phenomena.

After describing the device and its functioning, as a way of not limiting example there will be described some details relating to the dimensioning which make it particularly efficient. Two characteristic parameters can be defined to evaluate in design step the performances of the trap (1) according to the invention:

1) Rv defined as the ratio between the average speed inside the sedimentation area (13) and the average speed in the inlet opening (10) of the trap (1), obtained by dividing the crossing area of the duct in the inlet by the crossing area of the sedimentation chamber. The Rv parameter can be obtained from the relation $$Q=V\cdot A \qquad \text{(eq. 1)}$$

where Q is the inlet flowrate in the trap, V the average speed in the inlet opening (10) and A the area of the section of said opening. The flowrate Q being constant, indicating with As and Vs the area of the crossing section of the sedimentation chamber (13) and the average speed of the same, it results $$Q=V\cdot A=Vs\cdot As \qquad \text{(eq. 2)}$$

from which $$Rv=A/As=Vs/V \qquad \text{(eq. 3)}$$

2) Ra defined as the ratio between the length (Ls) of the sedimentation chamber and its length. This parameter is useful to define the trapping efficiency with respect to the average equivalent diameter of the particles, and it is a constructive parameter linked to the descending trajectory the particle has to follow in the sedimentation chamber in order to be trapped therein.

In other terms, after defining the minimum and expected design data relating to the specific weight and equivalent diameter of the sediments which are intended to be trapped and relating to the maximum value of the current dragging the particles in horizontal direction, by means of the sediment falling law (which considers both the weight force of the considered particles and the drag force) it is possible to individuate the descending trajectory. It is needed that such trajectory is inner to the sedimentation chamber (or at least that the trajectory does not go out from the outlet opening), which, so, will have a length and a height able to allow the particles falling.

With reference to the variation of the section of the inlet area (12), as yet said in a first embodiment, said section remains constant along the development of the inlet area (12); in a second embodiment the section variation increasing between the opening (10) and the end section (122) is about 10%, while the height diminishes by more than 50%. With reference to the longitudinal development of the system (i.e. in the flow direction), preferably but not limitingly, the lengths of the inlet (12) and outlet area (14) are equal to each other or anyway comparable, and are between 40 and 50 cm, while, as yet said, the length of the sedimentation chamber has a design length which depends on the expected value of the particle with lower specific weight and diameter and on the highest expected value of the current. With this dimensioning the height (H2) of the end section (122) of the inlet area (12) can have dimensions between 20 and 30 cm. As explained, the particles tend to sediment on the bottom (133) of the sedimentation area (13). According to a first embodiment shown for example in FIG. 3, the bottom (133) of the sedimentation area (13) is flat, and it can be disassembled at a horizontal section (134), to allow to retrieve the deposited sediments.

According to another embodiment not shown in figure, the sedimentation area (13) has in the lower portion a funnel development (136) which ends in a collecting area (137) where the sediments are collected. Conveniently, said collecting area can be removed for the sediments collecting.

Yet according to another embodiment, the inlet area can have a slightly convergent section, with anyway contained variations, so that to generate a pressure reduction which has an inviting effect of the sediments towards the sedimentation chamber.

This configuration, by exploiting the Venturi effect, and so, a pressure reduction in the sections with smaller area with relative speed increase, would allow current and particles to go towards the sedimentation chamber. Vice versa, in the outlet duct it creates a pressure increase in the flow direction which helps not to make the particles go out. The reduction or increase ratios of the crossing sections of the inlet and outlet ducts are design parameters variable as a function of the expected currents.

The trap (1) according to what described is configured to be installed so to maintain the horizontal position in the water and to be oriented automatically so to offer the inlet opening (10) to the current. To such aim, preferably but not limitingly, the device can provide on one or more outer surfaces hydrodynamic elements configured to offer the lower resistance to the water flow when the device is oriented according to what desired. With regards to the material the trap has to be built with, it is needed that both durability in a strongly corrosive and aggressive environment, such as the sea, and a certain lightness is guaranteed. Therefore, the materials used for the most common traps with vertical development are suitable, such for example plastic and metal materials with good durability in the sea, as for example bronze.

With the device according to the invention, tests have been carried out on a physical model by the Laboratorio di Ingegneria Costiera—LIC of the Dipartimento di Ingegneria Civile, Ambientale, del Territorio, Edile e di Chimica (DICATECh) of the Politecnico of Bari, numerical simulations and a field experimentation at 590 m of depth by Glomar-Challenger Basin area (Ross Sea, West Antarctica).

The tests demonstrated what follows:

1) the trap according to the invention is able to allow the sediments falling in presence of horizontal currents;

2) the choice of Rv and Ra parameters is a design element which can be modified in the realization step of the trap as a function of the typical speed of the currents of the area in which it is intended to be installed and as a function of the assumed dimensions of the particles to be trapped.

3) the tests on the physical model and by using a numerical code detected the functioning goodness.

4) the test carried out in Antarctica detected the efficacy of the proposed trap as well, which, just for its horizontal development, does not have the typical limits of the traps with vertical development known at the state of the art.

What just described was confirmed by the lab tests in terms of speed and turbulence parameters (see example A), by the numerical simulations (see example B) and by the evaluation in situ (see example C).

EXAMPLE A

Figure 6:
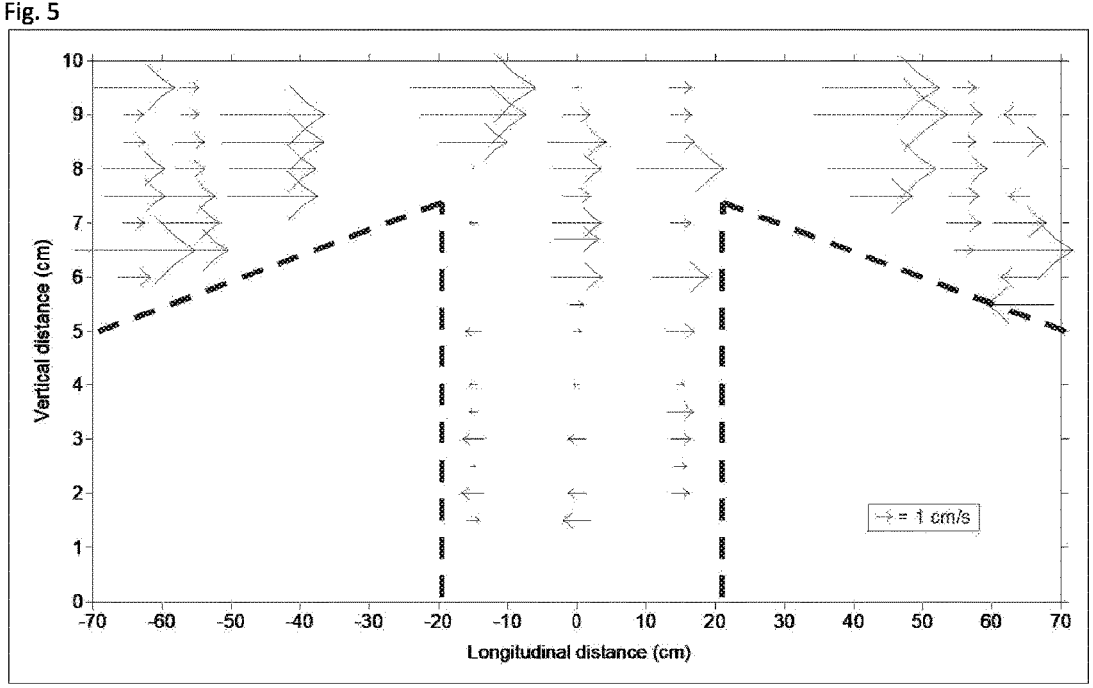

Tests on a physical model were carried out by the Laboratorio di Ingegneria Costiera—LIC of the Dipartimento di Ingegneria Civile, Ambientale, del Territorio, Edile e di Chimica (DICATECh) of the Politecnico of Bari, which demonstrate the remarkable reduction of speed in the sedimentation chamber. FIG. 6 shows the speed values measured inside the device with ADV system (Acoustic doppler velocimeter) 3D which highlights the reduction in speed in the central trapping chamber which allows the decantation of the particles and so their trapping.

EXAMPLE B

Numerical simulations were carried out by means of the ANSYS software of the speed and sedimentation while varying the geometry of the trap, the inlet speed of the current and of the particles.

Figure 7:
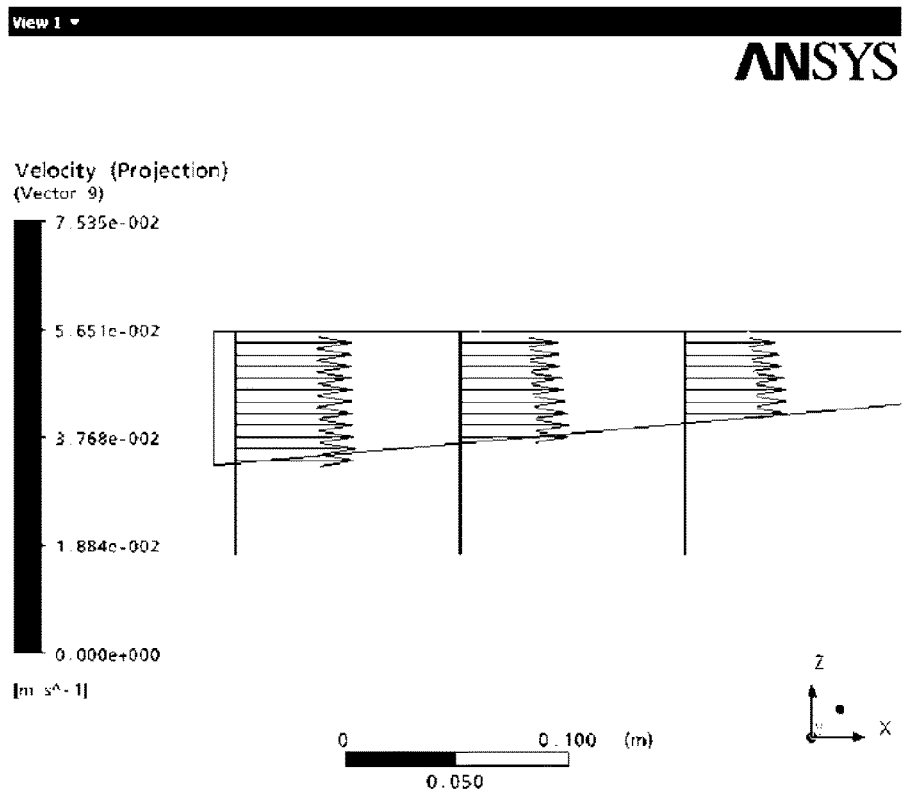
Figure 8:
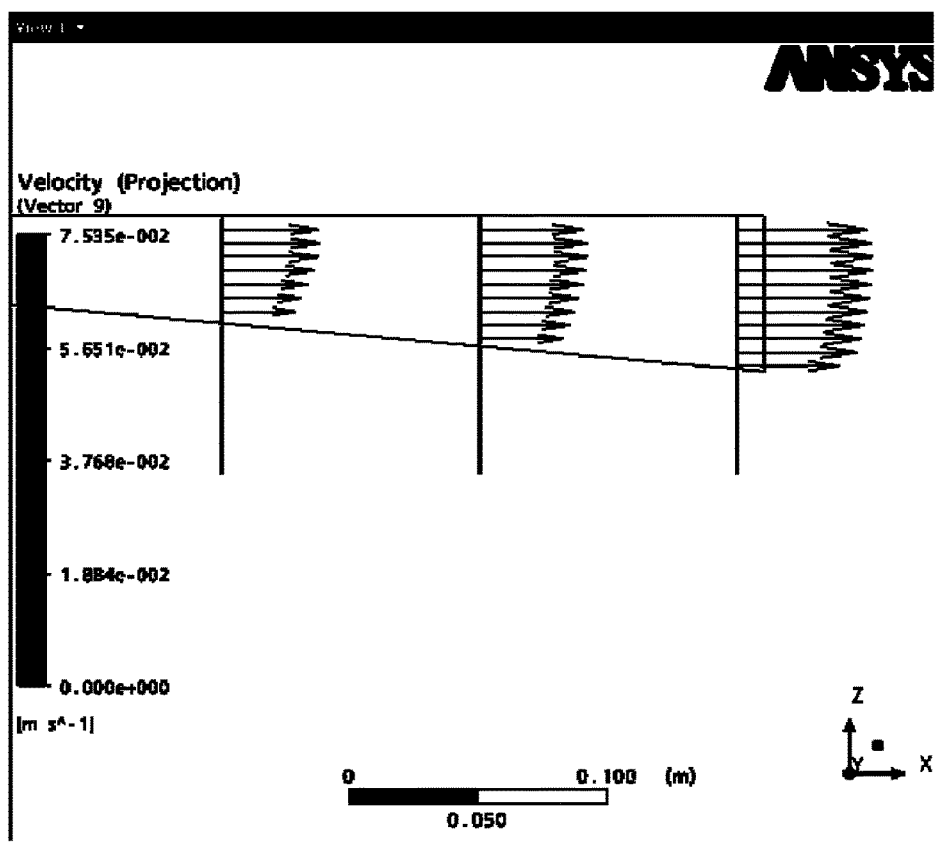

Some of them, which allowed to verify the functioning of the trap proposed, are described as a way of example. FIG. 7 shows a typical development of speed profiles in the inlet duct of the current, FIG. 8 reproduces the speed profiles in the outlet duct.

The values are uniform close to the inlet section (about 6 m/s in the simulation analyzed).

Figure 9:
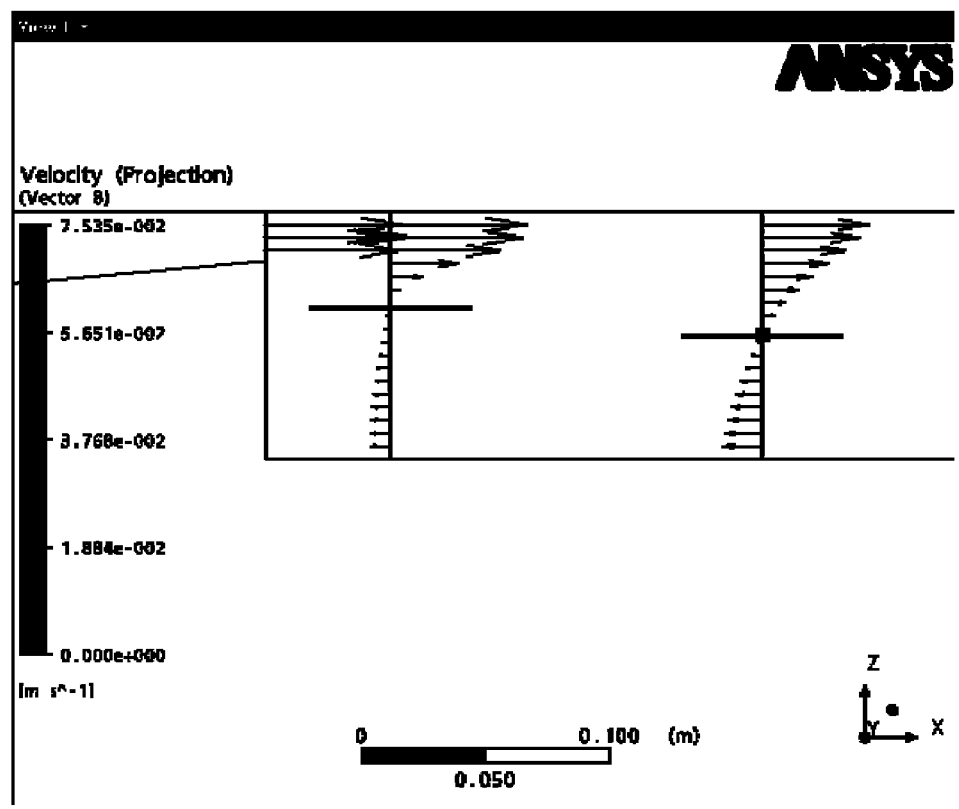
Figure 10:
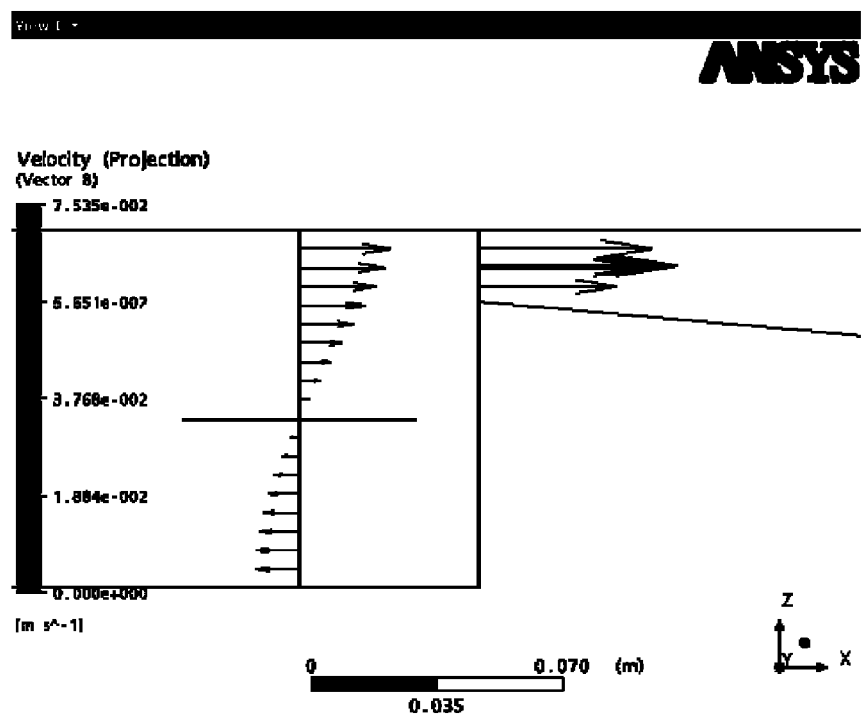

In the sedimentation chamber, as it is shown in FIG. 9, it is observed what follows.

In the initial section of the sedimentation chamber the speed values are very high, since the crossing area is very reduced. In the following, in the next two sections it is possible to see how the speed assumes different values (also of sign) while varying the vertical coordinate z. This explains the formation of vortexes with energy dissipation, characterized by speeds always decreasing up to a sign change. It is just due to the low speed of the current that the particle decants on the bottom of the trap. It is to be noted how the upper developments of the speed differ, by signing a decrease while increasing the distance x with respect to the inlet section. In fact, the speed inside the trap diminishes, according to what expected. In addition, one last observation has to be made for the point in which the speed is null: while x increases the point sinks.

Figure 11:
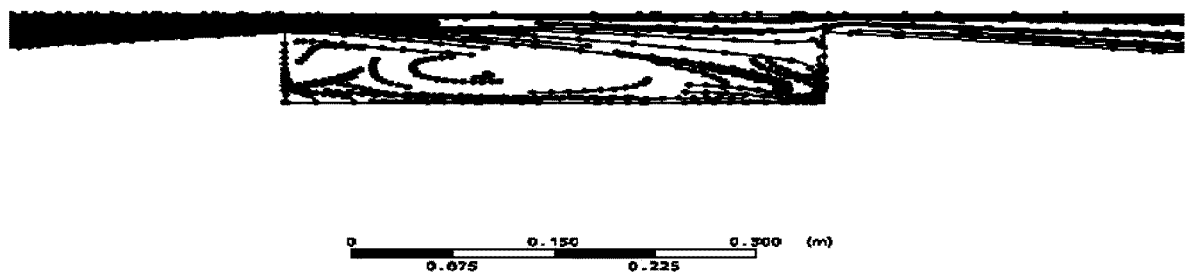

The behavior of the solid particles in the trap denotes a definite sedimentation on the bottom of the sedimentation chamber. FIG. 11 shows the trajectory of the sedimented particles in the case of the analyzed simulation.

EXAMPLE C

A horizontal trap was installed at 590 m depth on Morring HI in Glomar-Challenger Basin (Ross Sea, west Antarctica, figure CI), close to a classical vertical trap.

In particular, in one of the studies carried out it was present a current with maximum speed 10 cm/s. In this hydrodynamic condition, the horizontal trap (experimented, as yet said, with a classical vertical trap beside) had a good trapping efficiency, much better than the classical vertical traps. In presence of said current, the Annual Total Mass Flux, TMF in the horizontal trap was greater than the one in the vertical trap. These are very important particles from a scientific point of view which the vertical trap could not be able to capture.

The invention claimed is:

1. A trap (1) for marine sediments, comprising on two vertical sides, opposite to each other, a first inlet opening (10) and a second outlet opening (11), configured to allow the inlet and the outlet of the marine current, said trap (1) comprising between said two openings (10, 11):

an inlet area (12), whose section diverges in terms of width between said inlet opening (10) and the end section (122) of said inlet area (12);

a sedimentation area (13) having a section greater than said end section (122) of the inlet area (12), configured to allow the separation by gravity of the particles present in the marine current, and an outlet area (14) whose section converges in terms of width between the section where said outlet area (14) is connected to said sedimentation area (13) and said second outlet opening (11) and wherein the section of said inlet area (12) converges in terms of height between said inlet opening (10) and its own end section (122), the bottom of said inlet area (12) being convergent upwards;

and wherein the section of said outlet area (14) diverges in terms of height between the section in which said outlet area (14) is connected to said sedimentation area (13) and said second outlet opening (11).

2. The trap (1) for marine sediments according to claim 1, wherein said inlet area (12) has a crossing section constant along an axial development of said crossing section.

3. The trap (1) for marine sediments according to claim 1, wherein said sedimentation area (13) is provided with a constant width and equal to the width (L2) of the end portion of said inlet area (12), and said sedimentation area (13) is provided with a depth increase as well with respect to said inlet area (12) at the joining section of said areas.

4. The trap (1) for marine sediments according to claim 1, wherein said outlet area (14) is symmetrical to said inlet area (12) with respect to a vertical plane passing across the middle of said sedimentation area (13) and orthogonal to the current flow.

5. The trap (1) for marine sediments according to claim 1, wherein said inlet area (12) has a section variation increasing between the opening (10) and the end section (122) of said inlet area (12) is 10%, while its height diminishes by more than 50% between said sections.

6. The trap (1) for marine sediments according to claim 1, wherein said sedimentation area (13) has a bottom (133) which is flat, and wherein said bottom (133) can be disassembled at a horizontal section (134), to allow to retrieve the deposited sediments.

7. The trap (1) for marine sediments according to claim 1, wherein said sedimentation area (13) has in the lower portion a funnel development (136) which ends in a collecting area (137) where the sediments are collected.

8. The trap (1) for marine sediments according to claim 1, further comprising on one or more outer surfaces hydrodynamic elements configured to offer the lower resistance to the water flow when the device is oriented according to the marine current direction.

9. The trap (1) for marine sediments according to claim 1, wherein said inlet area (12) is horizontally divergent and vertically convergent, thus reducing completely the crossing section area in the flow direction, and said outlet area is horizontally convergent and vertically divergent, thus increasing completely gradually the crossing section area in the flow direction.

* * * * *